(12) United States Patent
Zhu et al.

(10) Patent No.: US 7,929,432 B2
(45) Date of Patent: Apr. 19, 2011

(54) FLEXIBLE STARTING TIME SCHEDULING ALGORITHM FOR BITMAP COEXISTENCE PROTECTION

(75) Inventors: Jing Zhu, Hillsboro, OR (US); Xue Yang, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 749 days.

(21) Appl. No.: 11/860,064

(22) Filed: Sep. 24, 2007

(65) Prior Publication Data

US 2009/0080401 A1    Mar. 26, 2009

(51) Int. Cl.
*H04W 4/00* (2009.01)

(52) U.S. Cl. ......... 370/229; 370/252; 370/329; 370/341

(58) Field of Classification Search ................... None
See application file for complete search history.

(56) References Cited

U.S. PATENT DOCUMENTS

| | | | |
|---|---|---|---|
| 7,394,768 B2 * | 7/2008 | Pedersen | 370/252 |
| 2004/0205000 A1 * | 10/2004 | Lund | 705/21 |
| 2008/0310391 A1 * | 12/2008 | Schneidman et al. | 370/349 |
| 2009/0245190 A1 * | 10/2009 | Higuchi et al. | 370/329 |

* cited by examiner

*Primary Examiner* — Chi H. Pham
*Assistant Examiner* — Shick Hom
(74) *Attorney, Agent, or Firm* — Carrie A. Boone, P.C.

(57) ABSTRACT

A flexible start time (FST) scheduling algorithm operable at a base station is disclosed, to allocate resource in the time domain based on coexistence period bitmap (CBP) feedback gathered from multi-radio user terminals. The algorithm analyzes traffic load distribution in the wireless neighborhood and determines an optimum starting time of the CBP operation for the current user.

7 Claims, 5 Drawing Sheets

FLEXIBLE STARTING TIME SCHEDULING ALGORITHM FOR BITMAP COEXISTENCE PROTECTION

CROSS-REFERENCE TO RELATED APPLICATIONS

This application claims priority under 35 U.S.C. 119(e) to U.S. patent application Ser. No. 11/845,004, entitled, "TECHNIQUES FOR COEXISTENCE-AWARE RESOURCE ALLOCATION IN WIRELESS NETWORKS", filed on Aug. 24, 2007.

TECHNICAL FIELD

This application relates to multiple-radio devices (MRDs) and, more particularly, to coexistence between WiMAX and bluetooth devices in the MRD.

BACKGROUND

The Institute of Electrical and Electronics Engineers (IEEE) has adopted a set of standards for wireless local area networks (WLANs), known as 802.11, as well a set of standards for wireless metropolitan area networks (WMANs), known as 802.16. Wireless products satisfying the 802.11 and 802.16 standards are currently on the market, for example. The term, WiFi, is used herein to describe equipment satisfying the 802.11 standard. The term, WiMAX, short for worldwide interoperability for microwave access, is used herein to describe equipment satisfying the 802.16 standard. Another technology standard, Bluetooth, is a wireless standard for wireless personal area networks (WPAN) developed by the Bluetooth special interest group (SIG), an industry association of electronics manufacturers.

Increasingly, computing or communication devices, such as laptop computers, handheld devices such as personal digital assistants (PDAs), cellular telephones, etc., are being equipped with multiple radios. These multiple radio devices, or MRDs, may simultaneously include Bluetooth, WiFi, and WiMAX radios, for example. The wireless spectrum has been carefully allocated to the different wireless technologies to avoid overlap and prevent interference between the different technologies. Nevertheless, simultaneous operation of multiple radios collocated on the same physical device is challenging, given the small form-factor and limited isolation (<25 dB) of the MRDs. Also, the MRDs continue to decrease in size, while the number of radios integrated within them keeps increasing.

Further, with the MRD, the radios may share components. For example, each radio device may share a radio frequency (RF) front-end and antenna, which may be expected to reduce the overall cost and size of the MRD.

When the radio devices are simultaneously in operation, interference or hardware resource conflicts may occur. To resolve this problem, some MRDs utilize interleaving radio activities (transmission or reception) in the time domain. FIG. 1 illustrates how a WiMAX radio may coexist with a WiFi radio in an MRD, by time-sharing the radio operations of each device, according to the prior art. The WiMAX radio receives data, followed by the WiFi radio transmitting data, followed by the WiMAX radio receiving more data, followed by the WiFi radio receiving data, finally followed by the WiMAX radio transmitting data. As FIG. 1 demonstrates, there is no overlapping of operations between the WiMAX operations and the WiFi operations. Instead, each operation of one radio is interleaved with the operation of the other radio. While this interleaving solves the interference and hardware resource conflict issues of the MRD, it is slower than is desirable.

Thus, there is a continuing need for a method by which the above shortcomings of the prior art may be overcome.

BRIEF DESCRIPTION OF THE DRAWINGS

The foregoing aspects and many of the attendant advantages of this document will become more readily appreciated as the same becomes better understood by reference to the following detailed description, when taken in conjunction with the accompanying drawings, wherein like reference numerals refer to like parts throughout the various views, unless otherwise specified.

DETAILED DESCRIPTION

In U.S. patent application Ser. No. 11/845,004, entitled, "TECHNIQUES FOR COEXISTENCE-AWARE RESOURCE ALLOCATION IN WIRELESS NETWORKS", a coexistence bitmap protection (CBP) method is proposed (hereinafter, "CBP method"). In the CBP method, a multi-radio user terminal feeds back a time-domain interference pattern, in which "bad" slots that are not suitable for resource allocation due to conflict in time-sharing coexistence operations are marked. In accordance with the embodiments described herein, a flexible start time (FST) scheduling algorithm operable at a base station is disclosed, to allocate resource in the time domain based on the CBP feedback gathered from multi-radio user terminals. The algorithm analyzes traffic load distribution in the wireless neighborhood and determines an optimum starting time of the CBP operation for the current user.

Figure 1:
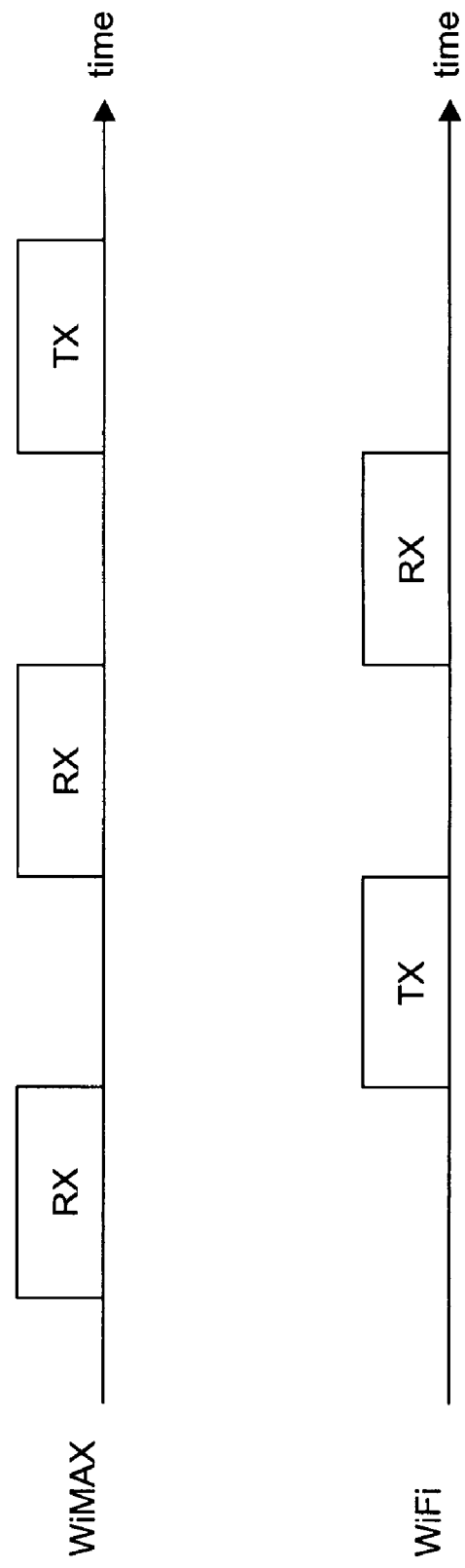
FIG. 1 is a diagram showing time-sharing operation of WiFi and WiMAX radios in a multiple-radio device, according to the prior art.
Figure 2:
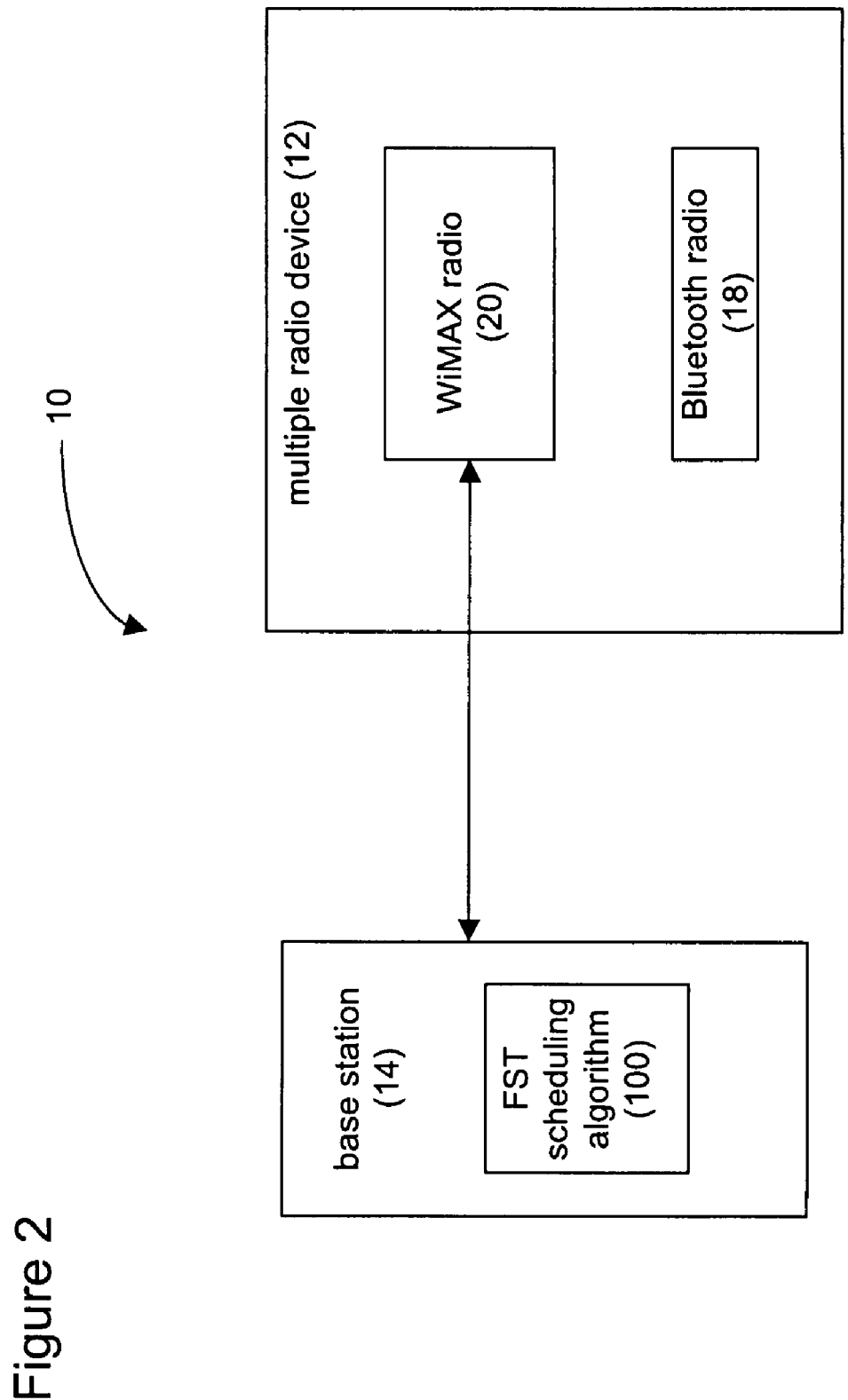
FIG. 2 is a block diagram of a wireless neighborhood, including a flexible starting time scheduling algorithm, according to some embodiments.

FIG. 2 is a block diagram of a wireless neighborhood 10, including a base station 14 and a multiple radio device (MRD) 12, which includes two co-existing radios, a WiMAX mobile station 20 and a Bluetooth radio 18. The base station includes a flexible starting time (FST) scheduling algorithm 100, for allocating resources in the time domain, such that the WiMAX radio 20 and the Bluetooth radio 18 may coexist in the MRD 12.

Figure 3:
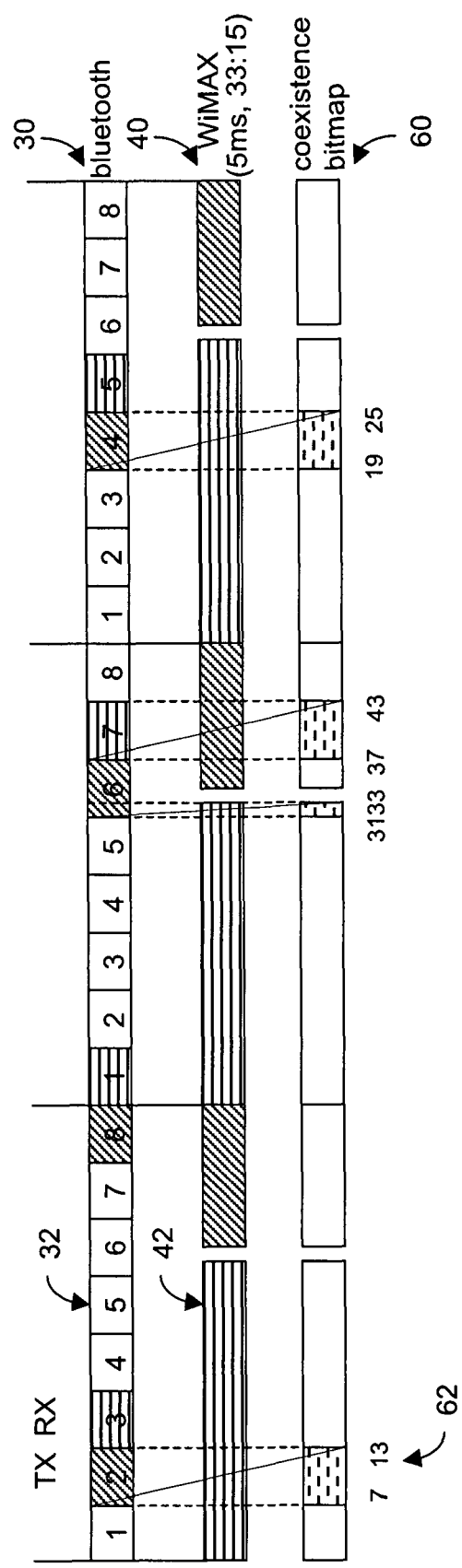
FIG. 3 is a diagram of coexistence bitmap protection, according to some embodiments.

FIG. 3 is a coexistence bitmap diagram 50, for generating a coexistence bitmap 60, according to some embodiments. The coexistence bitmap 50 can be obtained, for example, where a Bluetooth (BT) radio and a WiMAX radio coexist (also known as collocated) in a single MRD. The activity 30 of a collocated Bluetooth radio, the activity 40 of a WiMAX radio, and the coexistence bitmap 60, derived from the activity 30 and 40, are included in FIG. 3.

Numerous numbered Bluetooth slots 32 are shown, with each slot being 625 µs long. The transmission (TX) slots and the receiving (RX) slots are indicated with horizontal lines and diagonal lines, respectively. Thus, for example, slot 2 of the first eight slots 32 is a receiving slot while slot 3 is a transmission slot.

Next, the activity 40 of the collocated WiMAX radio is shown. The WiMAX radio has a frame 42, with a duration of 5 ms, the frame 42 is in time-division duplexing (TDD) mode. Thus, one WiMAX frame takes exactly the same time duration as eight Bluetooth slots. Again, transmission and reception slots are indicated using horizontal and diagonal lines, respectively.

With the activities 30 and 40 shown in FIG. 3, the possibility of inter-radio interference between the collocated Bluetooth and the WiMAX radios may be predicted. Inter-radio interference occurs if: 1) the Bluetooth transmission overlaps in time with the WiMAX reception; and 2) the WiMAX transmission overlaps in time with the Bluetooth reception.

The overlapping pattern between the WiMAX radio (activity 30) and the Bluetooth radio (activity 40) repeats every three WiMAX frames. Thus, the activities 30 and 40 shown in FIG. 2 can be expected to repeat indefinitely. The coexistence bitmap 60, at the bottom of the figure, is generated by first replicating the WiMAX frames. Then, an indication is made where in the WiMAX frame, a conflict occurred between the Bluetooth activity 30 and the WiMAX activity 40, according to one of the problem criteria (BT TX during WiMAX RX or BT RX during WiMAX TX).

The coexistence bitmap 60 is generated from the perspective of the WiMAX radio, which is collocated with a Bluetooth radio in the MRD. Conflicting regions 62 in the coexistence bitmap 60 are indicated using horizontal dashed lines. For the WiMAX radio, the conflicting regions are to be avoided for both transmission and reception, while the collocated BT radio is active in the MRD. The numbers adjoining the conflicting regions 62 denote the symbol index of the start and the end of a bad burst.

A coexistence bitmap period is defined as the duration (in terms of WiMAX frames) that the coexistence bitmap 60 covers. For the example in FIG. 3, the coexistence bitmap period is three (for the three WiMAX frames). Changing the configuration of the WiMAX and Bluetooth radios in the MRD may result in a different coexistence bitmap period.

Where a bitmap unit (BU) is defined as a resource allocation unit, corresponding to a bit in the bitmap, the BU of the coexistence bitmap 60 may be defined, without loss of generality. Without loss of generality, a BU of the bitmap 60 may be indicated, with (i, j, l) defined as follows:

i: the i-th frame in the bitmap j: the j-th slot in the i-th frame l: downlink or uplink (0 for downlink, and 1 for uplink)

In some embodiments, the flexible start time (FST) scheduling algorithm 100 schedules the starting time (in terms of frames) of the CBP operation for a newly arriving request.

Table 1 shows the original type-length-value (TLV) signal coding definition for a CBP request (REQ) or a CBP response (RSP), as proposed in the CBP method referred to above. Under the CBP method, a client, such as the MRD, determines when the CBP operation should start, while the base station has no control over the starting time. For the CBP request (downlink), the coding indicates the relevant bitmap (e.g., WiMAX or Bluetooth), the bitmap unit, the frame sequence number (FSN) of the starting frame, and the length of the bitmap. The coexistence bitmap is also included. For the CBP response (uplink), the coding includes only the bitmap indicator, and the downlink (DL) hit rate.

TABLE 1

| \multicolumn{4}{c}{TLV coding for CBP-REQ and CBP-RSP} | | | |
|---|---|---|---|
| type | length | Value | Scope |
| downlink | varied (>1 byte) | byte 1: bit 1: bitmap indicator; bits 2-8: bitmap unit (in unit of symbol) byte 2: FSN of starting frame byte 3: bitmap length (bit) after: bitmap | CBP-REQ |
| uplink | fixed (1 byte) | bit 1: bitmap indicator bits 3-5: DL hit rate | CBP-RSP |

In some embodiments, the FST scheduling algorithm 100 modifies the CBP signaling obtained by the CBP method, as shown in Table 1. Table 2 is a modified TLV signal coding definition for a CBP FST request (REQ) or a CBP FST response (RSP), as used by the FST scheduling algorithm 100.

The following modifications are made to Table 1, resulting in Table 2. The first bit of the second byte of the CPB-FST-REQ indicates whether the client allows FST or not for the downlink coexistence bitmap period. The remaining bits indicate the seven least significant bits (LSBs) of the frame sequence number (FSN) of the starting frame for the CBP operation that the client requests. Previously (Table 1), the entire second byte was allocated to the starting frame FSN.

Also, the first bit of the third byte of the CBP-FST-REQ indicates whether the client allows FST or not for the uplink CBP. The remaining seven bits of the third byte indicate the seven least significant bits of the starting frame FSN for the CBP operation that the client requests. Previously (Table 1), the first byte was used for the length of the bitmap.

Similarly, changes are made to the uplink, as indicated in Table 2. The first bit of the second byte of the CBP-FST-RSP is reserved, while the remaining seven bits indicate the seven LSBs of the starting frame FSN of the downlink CBP operation that the base station has decided to use for this client, based on the input received. Previously, there was no second byte, as the uplink CBP-RSP was fixed at one byte.

Also, the first bit of the third byte of the CBP_FST_RSP is reserved, while the remaining seven bits indicate the seven LSBs of the starting frame FSN of the uplink CBP operation that the base station has decided to use for this client, based on the input received.

Table 2 shows the new TLV (Type-Length-Value) coding for CBP-FST-REQ and CBP-FST-RSP, as described above.

TABLE 2

| \multicolumn{4}{c}{TLV coding for CBP-FST-REQ and CBP-FST-RSP} | | | |
|---|---|---|---|
| type | length | Value | scope |
| downlink | varied (>1 byte) | byte 1: bit 1: bitmap indicator; bits 2-8: bitmap unit (in unit of symbol) byte 2: bit 1: DL FST indicator; bits 2-8: FSN of DL FST starting frame byte 3: bit 1: US FST indicator; bits 2-8: FSN of UL FST starting frame byte 4: length of bitmap (bits) after: bitmap | CBP-FST-REQ |
| uplink | fixed (3 bytes) | byte 1: bit 1: bitmap indicator; bits 3-5: DL hit rate; bits 6-8: UL hit rate byte 2: bit 1: reserved; bits 2-8: | CBP-FST-RSP |

TABLE 2-continued

TLV coding for CBP-FST-REQ and CBP-FST-RSP

| type | length | Value | scope |
|------|--------|-------|-------|
|      |        | FSN of DL FST starting frame byte 3: bit 1: reserved; bits 2-8: FSN of UL FST starting frame | |

Figure 4:
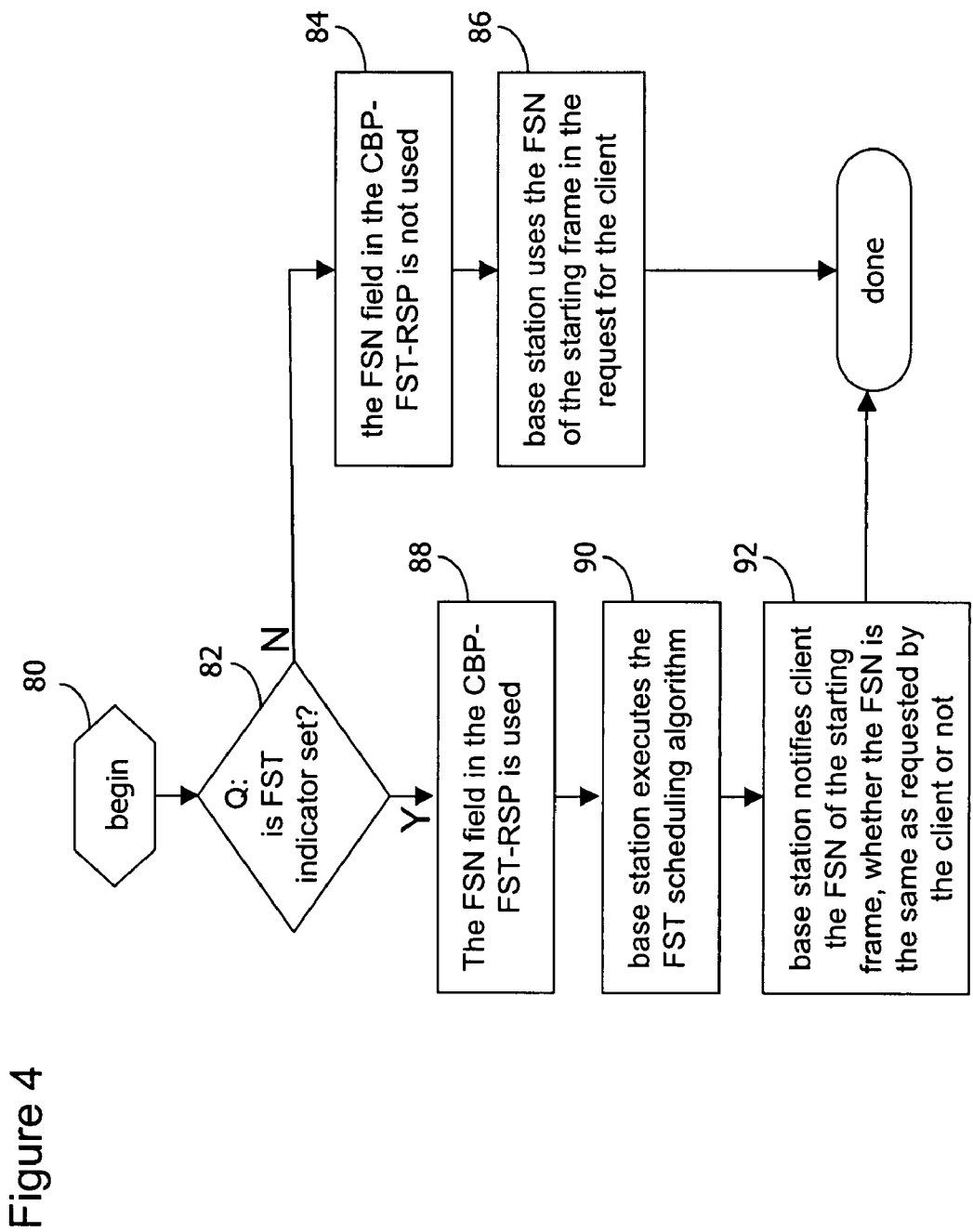
FIGS. 4 and 5 are flow diagrams showing operation of the flexible starting time scheduling algorithm of FIG. 2, according to some embodiments.

With the updated TLV coding described in Table 2, a pre-processing operation 80 further utilizes an FST indicator, as shown in the flow diagram of FIG. 4, according to some embodiments. The pre-processing operation 80 enables the MRD to determine whether the FST scheduling algorithm 100 should be used or not. The pre-processing operation 80 involves a protocol between the base station and the MRD while the FST scheduling algorithm 100 is executed by the base station only.

The pre-processing operation 80 first determines whether the FST indicator is set (block 82). If not, the FSN field (Table 2, bits 2-8 of bytes 2 and 3) in the CBP-FST-RSP shall not be used (block 84). Instead, the base station uses the FSN of the starting frame in the request for the client (Table 1, byte 2) (block 86).

If, instead, the FST indicator is set (block 82), the FSN field in the CBP-FST-RSP shall be used (block 88). At this time, the FST scheduling algorithm 100 (FIG. 5) is executed (block 90). As a result, the base station shall notify the client of the FSN of the starting frame, based on the result of the FST scheduling algorithm 100, whether the FSN is the same as in the request or not (block 92). Thus, FIG. 4 shows the request/response signaling protocol used by the FST scheduling algorithm 100.

Figure 5:
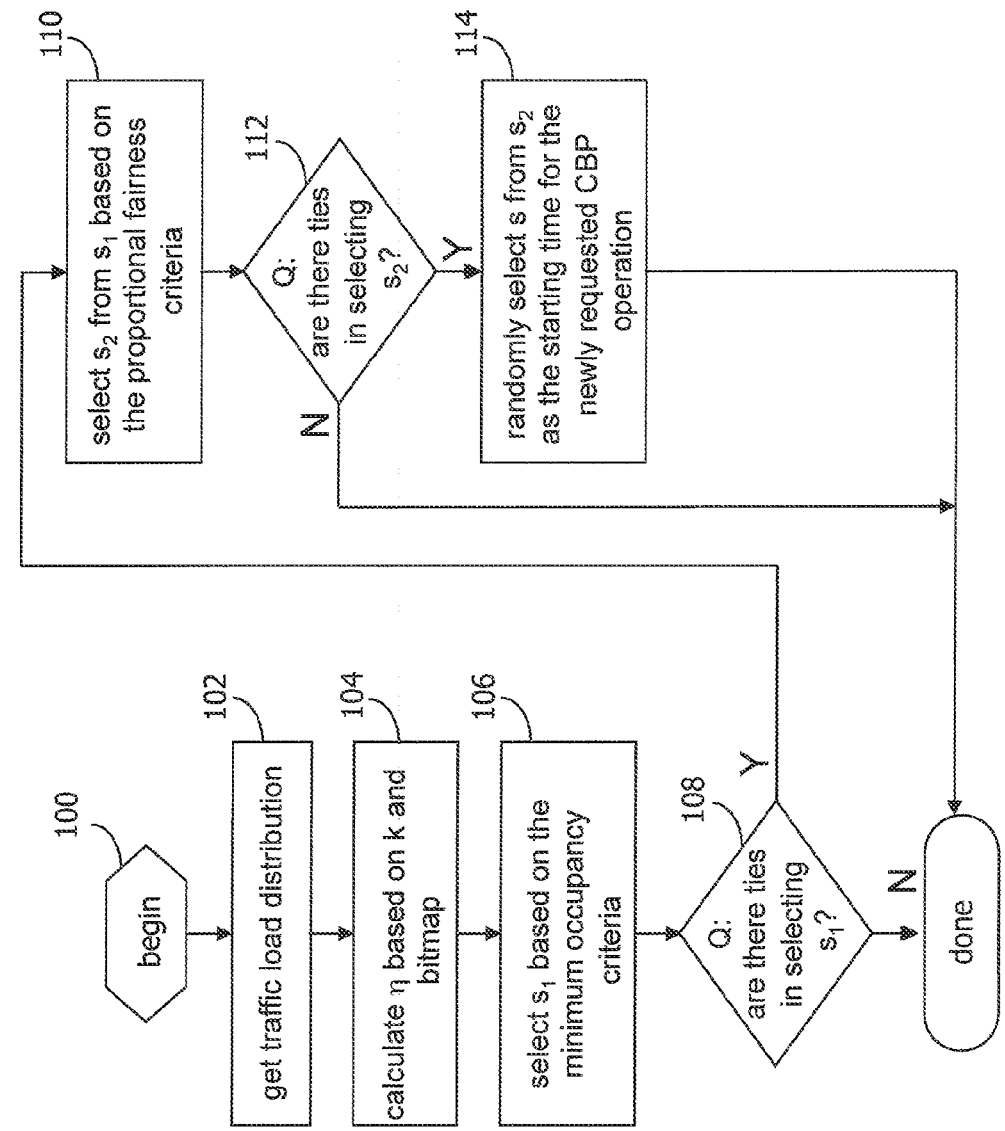

The FST scheduling algorithm 100 is depicted in FIG. 5, according to some embodiments. The FST scheduling algorithm 100 utilizes the following variables:

x(i, j, l): the current traffic load for bitmap unit, BU (i, j, l), with $1 \leq i \leq N$ and $1 \leq j \leq M$, where N indicates the number of BUs in a frame, and M indicates the number of frames in a bitmap. Here, the algorithm 100 assumes that all users use the same N and M for their bitmap request.

s: the starting time of the CBP operation for the current user $b(i, j, l)_k$: the bitmap for the newly arrived user after k-frame right cyclic shift (0: bad, 1: good), where k indicates the starting frame. Because the bitmap is periodic, with a period, M, k is an integer value between 1 and M.

Herein, traffic load is described as a relative figure and measured on a per bitmap period basis. For example, x(1, 1, 1)=1, means that the 1st BU of the 1st frame of the uplink bitmap has been fully occupied, and no room is available for new allocation.

With these variable definitions in mind, the FST scheduling algorithm 100 operates as illustrated in the flow diagram of FIG. 5, to determine the starting frame of the newly arrived request. The FST scheduling algorithm 100 obtains the current traffic load distribution (block 102), in order to get x(i, j, l). Any method for measuring traffic load may be used.

Once the traffic load distribution is known, the FST scheduling algorithm 100 decides s, the starting time of the CBP operation for the current user, for the newly requested bitmap. The remaining steps of FIG. 5 are employed to determine s. First, the base station calculates the total traffic load, denoted as η, for all the good bitmap units (block 104). From this, a first s is obtained, denoted $s_1$, based on the minimum occupancy criteria (block 106), the goal of which is to select the ones with least traffic load. In some embodiments, the FST scheduling algorithm 100 employs the following equation to calculate $s_1$, using minimum occupancy criteria:

$$s_1 = \underset{1 \leq k \leq M}{\arg\min}(\eta), \quad (1)$$

$$\text{where } \eta = \sum_i \sum_j x(i, j, l) b(i, j, l)_k \quad (2)$$

where b(i, j, l)=1 if the slot is good and b(i, j, l)=0 if the slot is bad.

If there exist ties in selecting $s_1$ (block 108), the base station further uses proportional fairness criteria, to select a second s, $s_2$ (block 110), the goal of which is to select the one with the most balanced traffic load distribution. In some embodiments, the FST scheduling algorithm 100 employs the following equation to calculate $s_2$, using proportional fairness criteria:

$$s_2 = \underset{k \in s_1}{\arg\max}(\rho), \quad (3)$$

where $$\left( \rho = \prod_i \prod_j x(i, j, l) b(i, j, l)_k \right) \quad (4)$$

If there still are ties (block 112), the base station can randomly pick one from $s_2$. Alternatively, the FST scheduling algorithm 100 can skip the selection process of $s_2$ (blocks 110 and 114) and break the ties of $s_1$ randomly.

The operation of the FST scheduling algorithm 100 may best be demonstrated with an example. Assume that there exists one bitmap unit (N=1), there are three frames in the bitmap (M=3), and the transaction is a downlink transaction (l=0). The bitmap unit is a WiMAX frame, and the bitmap period is three WiMAX frames.

First of all, the base station measures the current traffic load, and the load for the three bitmap units in a bitmap period is 0.5, 0.1, and 0.1, respectively (where "1" means full utilization). Based on the bitmap of a new request, the base station calculates the total traffic load for all the good bitmap units with different starting time. "k=3" is clearly the winner, and therefore s=3 is used for the new request.

First, the current traffic load distribution is measured (block 202), to get:

x(1, 1, 0)=0.5, x(1, 2, 0)=0.1, x(1, 3, 0)=0.1

Next, the FST scheduling algorithm 100 calculates η for the bitmap:

b(1, 1, 0)=1, b(1, 2, 0)=0, b(1, 3,0 )=1 with k={1, 2, 3}, to get:

η(k=1)=0.6, η(k=2)=0.6, η(k=3)=0.2,

Hence, s=3.

If the traffic load of the new request is 0.5 bitmap units per bitmap period, and the traffic of a client is allocated to all good bitmap units evenly, the resulting traffic load distribution over a bitmap period will be 0.5, 0.35, and 0.35, respectively.

However, without the FST scheduling algorithm 100, the resulting traffic load distribution could be 0.75, 0.1, and 0.35, such that the first frame in a bitmap period will be much more heavily loaded than other two.

As shown in this example, the FST scheduling algorithm 100 leverages multi-user diversity in the CBP feedback and improve the efficiency of radio resource allocation. Currently, there is no such scheme to support the time-sharing operation for WiMAX in order to coexist with other radios.

The FST scheduling algorithm 100 improves the efficiency of simultaneous multi-radio operations on the same platform, in some embodiments, thus improving the user experience and value of the MRD.

Co-located multi-radio co-existence is traditionally dealt with by improving the RF separation. However, it is increasingly difficult to provide RF separation, as the channel bandwidth increases and the form-factor gets smaller. The FST scheduling algorithm 100 provides the medium access controller (MAC) coordination mechanism to resolve the co-located multi-radio co-existence problem at the MAC layer at much lower cost than adding RF separation.

While the application has been described with respect to a limited number of embodiments, those skilled in the art will appreciate numerous modifications and variations therefrom. It is intended that the appended claims cover all such modifications and variations as fall within the true spirit and scope of the above description.

We claim:

1. A scheduling method to be used by a base station in scheduling communication with multiple users in a wireless neighborhood, the scheduling method comprising:

obtaining by the base station a coexistence bitmap between a first radio and a second radio in a multiple radio device, wherein the coexistence bitmap is derived from activity of the first radio and activity of the second radio;

obtaining a traffic load distribution of the wireless neighborhood, wherein the traffic load distribution is given by x(i, j, l) for bitmap unit, BU(i, j, l), with i indicating a frame number of the coexistence bitmap, j indicating a slot number in an $i^{th}$ frame, and l indicating whether the traffic load distribution is for an uplink operation or a downlink operation, with $1 \leq i \leq N$ and $1 \leq j \leq M$, with N indicating the number of bitmap units in a frame and M indicating the number of frames in the coexistence bitmap; and deciding a starting time for coexistence bitmap protection based on the traffic load distribution and the coexistence bitmap.

2. The scheduling method of claim 1 further comprising: calculating a total traffic load, η, using the equation, $$\eta = \sum_i \sum_j x(i, j, l) b(i, j, l)_k,$$

where b(i, j, l)=1 if the slot is good and b(i, j, l)=0 if the slot is bad.

3. The scheduling method of claim 2, further comprising: selecting a first starting time based on minimum occupancy criteria, wherein the first starting time is the starting time used for coexistence bitmap protection if there exist no ties following selection of the first starting time.

4. The scheduling method of claim 3, further comprising: obtaining the first starting time using the equation $$S_1 = \underset{1 \leq k \leq M}{\operatorname{argmin}}(\eta),$$

where $$\eta = \sum_i \sum_j x(i, j, l) b(i, j, l)_k,$$

wherein b(i, j, l)=1 if the slot is good and b(i, j, l)=0 if the slot is bad.

5. The scheduling method of claim 4, further comprising: determining that there is a tie in selecting the first starting time; and selecting a second starting time based on proportional fairness criteria, wherein the second starting time is used as the starting time if there are no ties in selecting the second starting time.

6. The scheduling method of claim 5, further comprising: selecting the second starting time according to the equation:

$$s_2 = \underset{k \in s_1}{\operatorname{argmax}}(\rho)$$

where $$\rho = \prod_i \prod_j x(i, j, l) b(i, j, l)_k.$$

7. The scheduling method of claim 6, further comprising: randomly selecting the starting time from the second starting time.

* * * * *